(12) United States Patent
Somerfield et al.

(10) Patent No.: US 11,988,261 B2
(45) Date of Patent: May 21, 2024

(54) BIASING SYSTEM FOR AN ACTUATOR

(71) Applicant: Goodrich Actuation Systems Limited, West Midlands (GB)

(72) Inventors: Michael Somerfield, Staffordshire (GB); Mark Hubberstey, Staffordshire (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 0 days.

(21) Appl. No.: 17/586,003

(22) Filed: Jan. 27, 2022

(65) Prior Publication Data
US 2022/0252122 A1  Aug. 11, 2022

(30) Foreign Application Priority Data
Feb. 9, 2021 (EP) .................... 21155949

(51) Int. Cl.
*F16F 1/02* (2006.01)
(52) U.S. Cl.
CPC ...................... *F16F 1/02* (2013.01)
(58) Field of Classification Search
CPC ............... F16F 1/02; F16B 1/02; F16B 1/04
See application file for complete search history.

(56) References Cited

U.S. PATENT DOCUMENTS

| | | | | |
|---|---|---|---|---|
| 2,887,091 A | * | 5/1959 | Martin | G05G 5/04 92/13.4 |
| 2,970,573 A | * | 2/1961 | Geyer | F15B 15/261 92/33 |
| 3,314,335 A | * | 4/1967 | Gulick | F15B 15/261 92/26 |
| 3,451,313 A | | 6/1969 | Andersen | |
| 8,191,440 B2 | | 6/2012 | Hadley et al. | |
| 10,677,194 B2 | | 6/2020 | Hawksworth et al. | |
| 2017/0106146 A1 | * | 4/2017 | Folk | A61M 5/20 |
| 2018/0335115 A1 | * | 11/2018 | Hawksworth | F02K 1/766 |

FOREIGN PATENT DOCUMENTS

| | | |
|---|---|---|
| EP | 0801221 A2 | 10/1997 |
| EP | 0801221 A3 | 11/1998 |
| EP | 2149496 A1 | 2/2010 |
| EP | 3279458 A1 | 2/2018 |

OTHER PUBLICATIONS

European Search Report for Application No. 21155949.7, dated Jul. 20, 2021, 5 pages.

* cited by examiner

*Primary Examiner* — Vishal R Sahni
(74) *Attorney, Agent, or Firm* — CANTOR COLBURN LLP

(57) ABSTRACT

A biasing system for an actuator. The system includes a lock sleeve, a lock shaft, a tine having a tine finger extending along a longitudinal axis, a biasing member and a biasing spring. The biasing member and biasing spring are configured to maintain a position of the tine finger away from the longitudinal axis in the direction of the lock sleeve when the lock shaft and the lock sleeve are deployed, in use, such that, when the lock sleeve is returned, the tine finger is biased against the lock sleeve to prevent the lock sleeve from returning to a locked position before the lock shaft is able to return to a locked position.

4 Claims, 3 Drawing Sheets

BIASING SYSTEM FOR AN ACTUATOR

CROSS-REFERENCE TO RELATED APPLICATIONS

This application claims priority to European Patent Application No. 21155949.7 filed Feb. 9, 2021, the entire contents of which is incorporated herein by reference.

FIELD OF THE INVENTION

The present disclosure relates to a biasing system for an actuator.

BACKGROUND

A tine lock and lock sleeve is typically used in an actuator for a thrust reverser. After deployment, the lock may have difficulty in returning to a stowed and locked position. Certain failures in the door locking actuator can lead to the lock sleeve inadvertently returning to the locked position prior to the door fully stowing and the tine lock being engaged. The tine lock is then unable to engage but the system will signal locked as the position of the lock sleeve is sensed, not the position of the door.

SUMMARY OF THE INVENTION

A biasing system for an actuator is provided. The system comprises a lock sleeve, a lock shaft, a tine having a tine finger extending along a longitudinal axis, a biasing member and a biasing spring. When the lock sleeve and lock shaft are deployed, in use, the biasing member and biasing spring are configured to maintain a position of the tine finger away from the longitudinal axis in the direction of the lock sleeve such that, when the lock sleeve is returned, the tine finger is biased against the lock sleeve to prevent the lock sleeve from returning to a locked position before the lock shaft is able to return to a locked position.

The lock sleeve may include a first surface and a second surface. The tine finger may include a first surface, a second surface, a third surface and a protrusion. The lock shaft may include a first surface, a second surface and a third surface. The biasing member may include a first end.

The biasing system may further include a locked position, an intermediate position and a transition position.

As an example, in a locked position, the tine finger may be in a relaxed state and may be sandwiched between the first surface of the lock shaft and the first surface of the lock sleeve. The tine finger may be parallel to the longitudinal axis. The first end of the biasing member may be in contact with the second surface of the lock shaft such that the biasing spring is held in a compressed state by the second surface of the lock shaft.

As an example, in an intermediate position, the lock sleeve may be deployed, in use, and the third surface of the lock shaft may be configured to engage the protrusion of the tine finger such that the tine finger may move in a direction away from the longitudinal axis towards the lock sleeve.

As an example, in a transition position, the tine finger may be biased in a direction away from the longitudinal axis towards the lock sleeve by the biasing member, and wherein, when the lock sleeve returns, in use, the third surface of the tine finger may contact the second surface of the lock sleeve to prevent the lock sleeve to move to a closed/locked position.

An actuator includes the biasing system as described above.

A thrust reverser includes the actuator.

A method for biasing a lock sleeve in an actuator is also provided. The method comprises providing a tine having a tine finger extending along a longitudinal axis and wherein the tine finger is in a relaxed state and wherein the tine finger is sandwiched between a lock sleeve and a lock shaft in a locked position, deploying the lock sleeve and lock shaft along a longitudinal axis away from the tine such that the tine finger is not in contact with the lock sleeve and the lock shaft, biasing the tine finger in a direction perpendicular to the longitudinal axis and towards the lock sleeve, wherein, when the lock sleeve returns, the tine finger is biased against the lock sleeve to prevent the lock sleeve from returning to a locked position before the lock shaft is able to return to a locked position.

The lock sleeve may include a first surface and a second surface. The tine finger may include a first surface, a second surface, a third surface and a protrusion. The lock shaft may include a first surface, a second surface and a third surface. The biasing member may include a first end.

The method may further include a locked position, an intermediate position and a transition position.

As an example, in a locked position, the tine finger may be in a relaxed state and may be sandwiched between the first surface of the lock shaft and the first surface of the lock sleeve. The tine finger may be parallel to the longitudinal axis. The first end of the biasing member may be in contact with the second surface of the lock shaft such that the biasing spring may be held in a compressed state by the second surface of the lock shaft.

As an example, in an intermediate position, the lock sleeve may be deployed, in use, and the third surface of the lock shaft may engage the protrusion of the tine finger such that the tine finger may move in a direction away from the longitudinal axis towards the lock sleeve.

As an example, in a transition position, the tine finger may be biased in a direction away from the longitudinal axis towards the lock sleeve by the biasing member, and wherein, when the lock sleeve returns, in use, the third surface of the tine finger may contact the second surface of the lock sleeve to prevent the lock sleeve to move to a closed/locked position.

DETAILED DESCRIPTION

Figure 1:
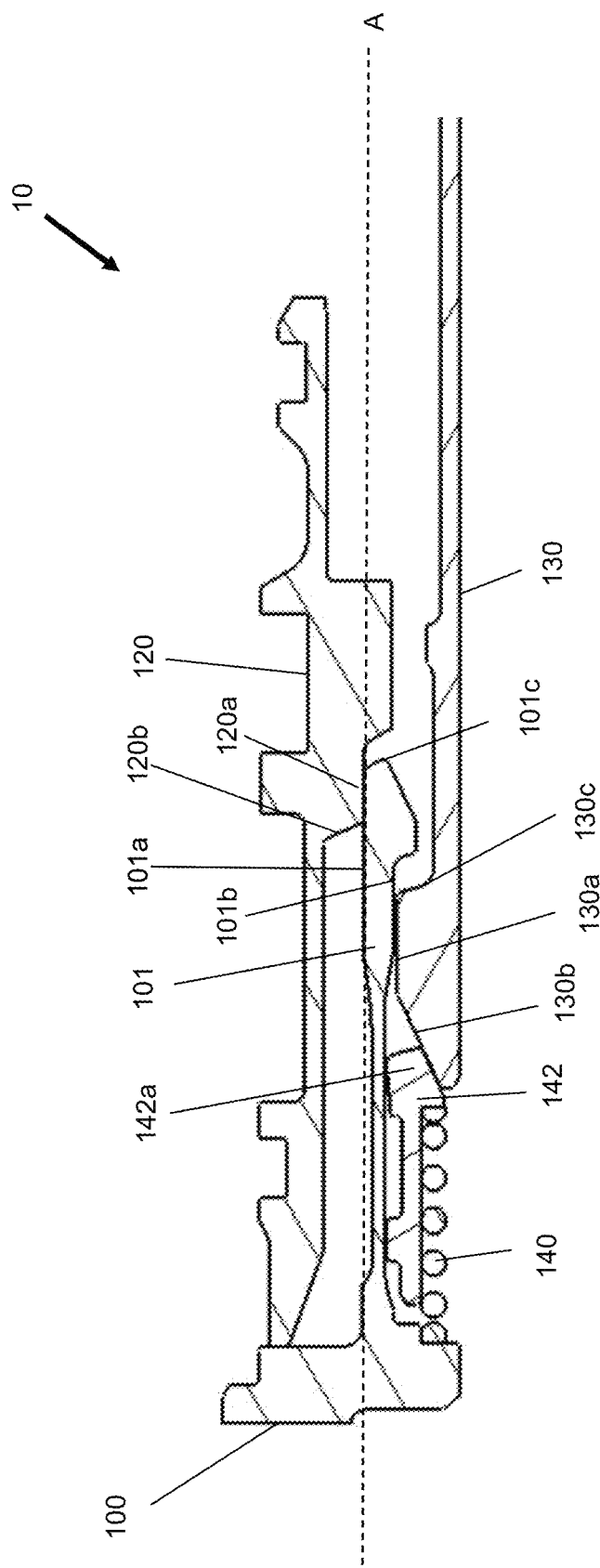
FIG. 1 shows an exemplary view of a portion of an actuator in a stowed and locked position.

FIG. 1 shows an exemplary view of a portion of an actuator 10 in a stowed and locked position. Generally, the portion of the actuator 10 may include a tine 100, a tine finger 101, a lock sleeve 120, a lock shaft 130, a biasing member 142 (e.g. a baulk) and a biasing spring 140 (e.g. a baulk spring). As shown in FIG. 1, the tine finger 101 is in a relaxed state and engages the lock sleeve 120 and the lock shaft 130, such that the tine finger 101 is sandwiched between the lock sleeve 120 and the lock shaft 130. The biasing member 142 is engaged with the lock shaft 130 such that the lock shaft 130 acts to maintain the biasing member 142 and biasing spring 140 in a compressed state.

An exemplary actuator 10 is shown in FIG. 1. The arrangement of the actuator 10 is shown for exemplary purposes only and, of course, it is envisaged that the tine 100, tine finger 101, lock sleeve 120, lock shaft 130, biasing member 142 and biasing spring 140 may be arranged in a different manner to achieve the same result.

As shown in FIG. 1, the lock sleeve 120 may include a first surface 120a and a second surface 120b. The tine finger 101 may include a first surface 101a, a second surface 101b and a third surface 101c. The lock shaft 130 may include a first surface 130a, a second surface 130b and a third surface 130c. The biasing member 142 may have a first end 142a. The portion of the actuator 10 has a longitudinal axis, as shown by dotted line A.

As the tine finger 101 is in a relaxed state in FIG. 1, the tine finger 101 lies in parallel with the longitudinal axis A. In a locked position, the first surface 101a of the tine finger 101 is adjacent the first surface 120a of the lock sleeve 120. The second surface 101b of the tine finger 101 is adjacent the first surface 130a of the lock shaft 130. Therefore, the tine finger 101 is sandwiched between the first surface 120a of the lock sleeve 120 and the first surface 130a of the lock shaft 130, which maintains the position of the tine finger 101, along the longitudinal axis A, in a locked position.

In the example shown in FIG. 1, the first end 142a of the biasing member 142 is in contact with the second surface 130b of the lock shaft 130. As shown in FIG. 1, the biasing spring 140 is held in a compressed state by the first end 142a of the biasing member 142 being in contact with the second surface 130b of the lock shaft 130. In other words, the lock shaft 130 is holding the biasing member 142 and biasing spring 140 in place until the lock shaft 130 moves out of a locked position.

Figure 2:
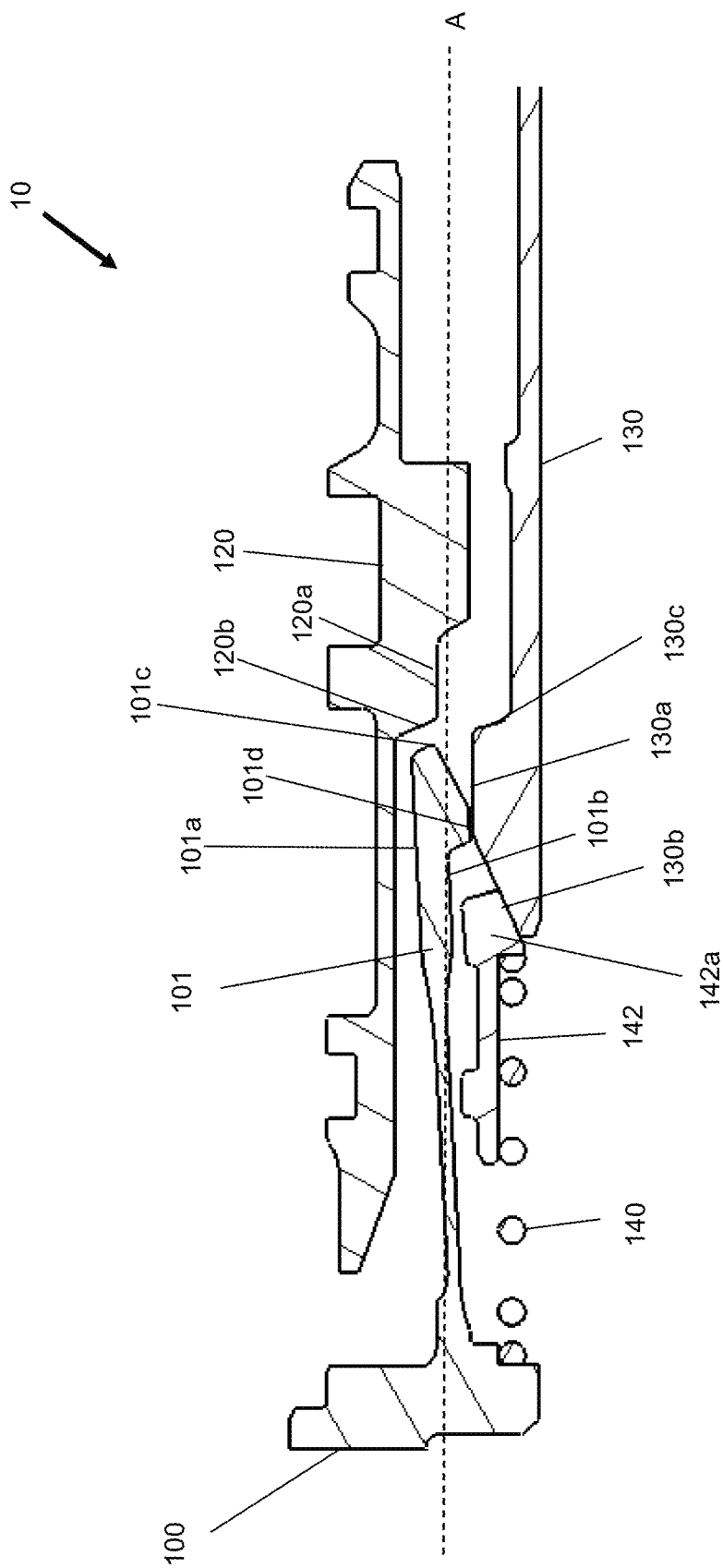
FIG. 2 shows an exemplary view of the portion of the actuator of FIG. 1 in an intermediate position.

FIG. 2 shows an exemplary view of a portion of the actuator 10 in an intermediate position. Generally, and as shown in FIG. 2, the lock sleeve 120 has moved in a longitudinal direction away from the tine finger 101. The lock shaft 130 has also moved in a longitudinal direction and has engaged with the tine finger 101 to displace the tine finger 101 in a direction towards the lock sleeve 120. As the lock shaft 130 moves in a longitudinal direction away from the tine 100, the biasing spring 140 expands and moves the biasing member 142 towards the tine finger 101.

The exemplary actuator 10 of FIG. 1 in an intermediate position is shown in FIG. 2. The arrangement of the actuator 10 is shown for exemplary purposes only and, of course, it is envisaged that the tine 100, tine finger 101, lock sleeve 120, lock shaft 130, biasing member 142 and biasing spring 140 may be arranged in a different manner to achieve the same result.

As shown in FIG. 2, the lock sleeve 120 may include the first surface 120a and the second surface 120b. The tine finger 101 may include the first surface 101a, the second surface 101b, the third surface 101c and a protrusion 101d. The lock shaft 130 may include the first surface 130a, the second surface 130b and the third surface 130c. The biasing member 142 may include the first end 142a. The portion of the actuator 10 includes the longitudinal axis, as shown by dotted line A.

In the intermediate position, the lock sleeve 120 has moved in a direction along the longitudinal axis A away from the tine 100. The first surface 101a of the tine finger 101 is now not adjacent the first surface 120a of the lock sleeve 120 and is free to move in a perpendicular direction away from the longitudinal axis A. As the lock shaft 130 translates along the longitudinal axis A, the first surface 130a of the lock shaft 130 moves alongside the second surface 101b of the tine finger 101 and the third surface 130c of the lock shaft 130 is configured to engage with the protrusion 101d. The third surface 130c of the lock shaft 130 therefore forces the protrusion 101d of the tine finger 101, and in turn the tine finger 101, in a perpendicular direction away from the longitudinal axis A towards the lock sleeve 120. The first end 142a of the biasing member 142 also translates along the longitudinal axis A by virtue of the biasing member 142 being in contact with the second surface 130b of the lock shaft 130 and the spring decompressing as the lock shaft 130 translates along the longitudinal axis A. The biasing member 142 is shaped such that it maintains the position of the tine finger 101 in a deformed state after the lock shaft 130 has been deployed and the first end 142a of the biasing member 142 is no longer engaged with the second surface 130b of the lock shaft 130. For example, the first end 142a of the biasing member 142 may contact the second surface 101b and the protrusion 101d of the tine finger 101 to stop the tine finger 101 from returning to a relaxed state (shown in more detail in FIG. 3).

Figure 3:
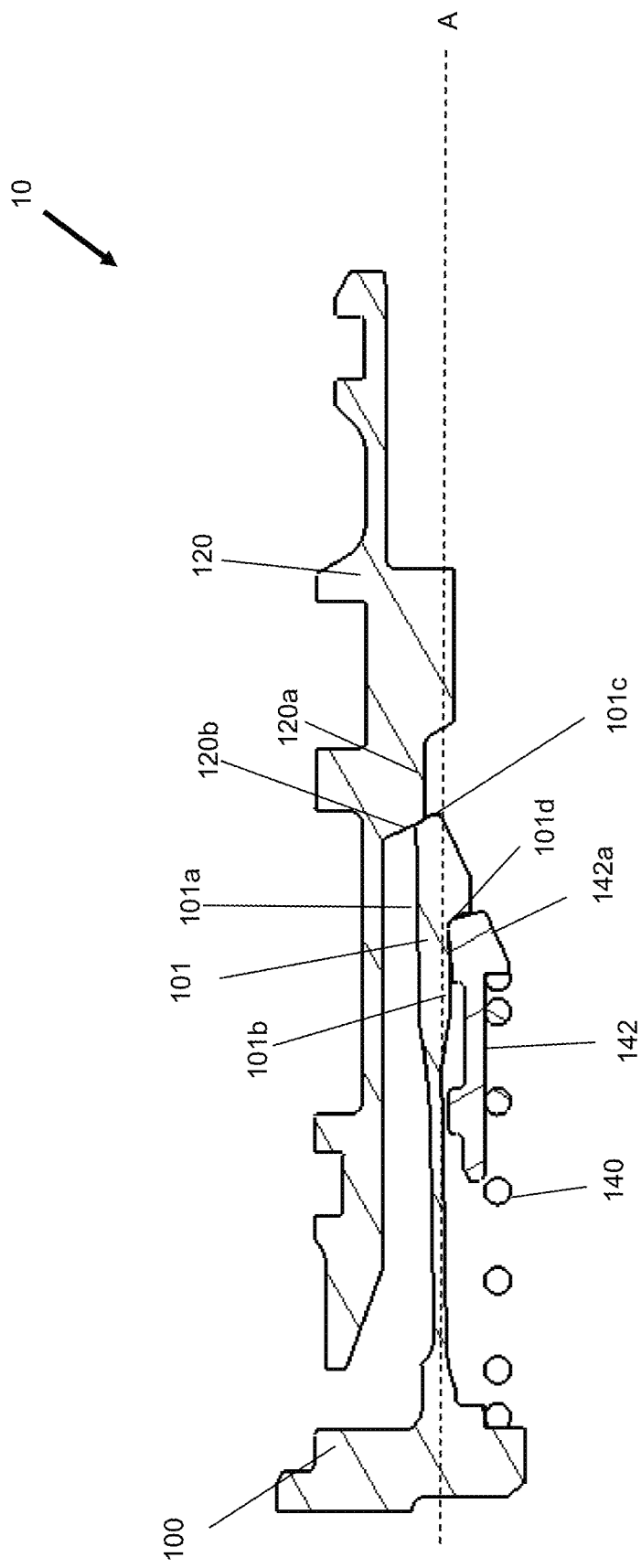
FIG. 3 shows an exemplary view of the portion of the actuator of FIGS. 1 and 2 in a transition position.

FIG. 3 shows an exemplary view of a portion of the actuator 10 in a transition position. A transition position, for the purposes of the example of FIG. 3, is a position in which the lock sleeve 120 is returning in a direction along the longitudinal axis A toward the tine finger 101. Generally, and as shown in FIG. 3, the lock shaft has fully deployed and is no longer in view on FIG. 3. The biasing spring 140 is now in a fully expanded state and the biasing member 142 is engaged with the tine finger 101 to maintain the position of the tine finger 101. In FIG. 3, the lock sleeve 120 has returned and the position of the tine finger 101, being held by the biasing member 142, prevents the lock sleeve 120 from fully retracting into the actuator. In other words, the tine finger 101 engages with the lock sleeve 120 such that the lock sleeve 120 cannot be restored to a locked position. This entire mechanism therefore allows the lock shaft 130 (not shown in FIG. 3) to return to a locked position (as shown in FIG. 1) before the lock sleeve 120 is able to return to a locked position. As the lock shaft 130 returns, the lock shaft 130 again engages with and moves the biasing member 142 and compresses the biasing spring 140 such that the tine finger 101 can move back to a relaxed state and be, once again, sandwiched between the lock sleeve 120 and lock shaft 130.

The exemplary actuator 10 of FIGS. 1 and 2 in a transition position is shown in FIG. 3. The arrangement of the actuator 10 is shown for exemplary purposes only and, of course, it is envisaged that the tine 100, tine finger 101, lock sleeve 120, lock shaft 130, biasing member 142 and biasing spring 140 may be arranged in a different manner to achieve the same result.

As shown in FIG. 3, the lock sleeve 120 may include the first surface 120a and the second surface 120b. The tine finger 101 may include the first surface 101a, the second surface 101b, the third surface 101c and the protrusion 101d. The biasing member 142 may include the first end 142a. The portion of the actuator 10 includes the longitudinal axis, as shown by dotted line A.

In the transition position, the lock shaft 130 has completely deployed. In the example shown in FIG. 3, the lock sleeve 120 has returned. However, the lock sleeve 120 may or may not be present in FIG. 3 and the biasing member 142 may be acting on the tine finger 101 to be positioned in a direction away from the longitudinal axis A to mate with the lock sleeve 120 when it returns.

The example shown in FIG. 3 depicts the lock sleeve 120 returned from an unlocked to a near-closed position. However, in order to avoid the lock sleeve 120 returning fully, the third surface 101c of the tine finger 101 contacts the second surface 120b of the lock sleeve 120. The arrangement of the tine finger 101 being biased by the biasing member 142 allows the tine finger 101 to stop the movement of the lock sleeve 120 to a closed/locked position, which can result in false readings of the actuator 10 being returned to a fully closed/locked position before the lock shaft 130 has returned fully. When the lock shaft 130 (not shown in FIG. 3) returns, the second surface 130b of the lock shaft 130 will once again contact the biasing member 142 and biasing spring 140. The lock shaft 130 will therefore compress the biasing spring 140 and move the biasing member 142 along the longitudinal direction towards the tine 100. The second surface 101b and protrusion 101d of the tine finger 101 will then be able to move to a relaxed state, as the first surface 130a and third surface 130c of the lock shaft 130 passes until the lock shaft 130 has fully returned. When the lock shaft 130 is fully returned, the second surface 101b of the tine finger 101 will be adjacent the second surface 130b of the lock shaft 130 and will be sandwiched between the first surface 120a of the lock sleeve 120 and the first surface 130a of the lock shaft 130, as shown in FIG. 1.

The exemplary biasing system described above may result in lighter, cheaper and more reliable system architectures. For example, ordinary switches may be removed by the inclusion of the biasing system.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A biasing system for an actuator, the system comprising:
    a lock sleeve, wherein the lock sleeve includes a first surface and a second surface;
    a lock shaft, wherein the lock shaft includes a first surface, a second surface and a third surface;
    a tine having a tine finger extending along a longitudinal axis, wherein the tine finger includes a first surface, a second surface, a third surface and a protrusion;
    a biasing member, wherein the biasing member includes a first end; and
    a biasing spring;
    wherein the biasing member and the biasing spring are configured to maintain a position of the tine finger away from the longitudinal axis in the direction of the lock sleeve when the lock sleeve and lock shaft are deployed, in use;
    wherein, when the lock sleeve is returned, the tine finger is biased against the lock sleeve to prevent the lock sleeve from returning to a locked position before the lock shaft is able to return to a locked position;
    wherein the system includes a locked position, an intermediate position and a transition position;
    wherein, in the locked position, the tine finger is in a relaxed state and is sandwiched between the first surface of the lock shaft and the first surface of the lock sleeve, and wherein the tine finger is parallel to the longitudinal axis; and
    wherein the first end of the biasing member is in contact with the second surface of the lock shaft such that the biasing spring is held in a compressed state by the second surface of the lock shaft;
    wherein, in the intermediate position, the lock sleeve is deployed, in use, and the third surface of the lock shaft is configured to engage the protrusion of the tine finger such that the tine finger is configured to move in a direction away from the longitudinal axis towards the lock sleeve;
    wherein, in the transition position, the tine finger is biased in a direction away from the longitudinal axis towards the lock sleeve by the biasing member, and wherein, when the lock sleeve returns, in use, the third surface of the tine finger contacts the second surface of the lock sleeve to prevent the lock sleeve to move to a closed/locked position.

2. An actuator comprising:
    the biasing system as claimed 1.

3. A thrust reverser comprising:
    the actuator of claim 2.

4. A method for biasing a lock sleeve in an actuator, the method comprising:
    providing a tine having a tine finger extending along a longitudinal axis and wherein the tine finger is in a relaxed state and wherein the tine finger is sandwiched between a lock sleeve and a lock shaft in a locked position;
    deploying the lock sleeve and lock shaft along a longitudinal axis away from the tine such that the tine finger is not in contact with the lock sleeve and the lock shaft;
    biasing the tine finger in a direction perpendicular to the longitudinal axis and towards the lock sleeve when the lock sleeve and lock shaft are deployed, wherein, when the lock sleeve returns, the tine finger is biased against the lock sleeve to prevent the lock sleeve from returning to a locked position before the lock shaft is able to return to a locked position;
    wherein the lock sleeve includes a first surface and a second surface;
    wherein, the tine finger includes a first surface, a second surface, a third surface and a protrusion;
    wherein the lock shaft includes a first surface, a second surface and a third surface;
    wherein the biasing member includes a first end;
    wherein the lock sleeve can be located in a locked position, an intermediate position and a transition position;
    wherein, in the locked position, the tine finger is in a relaxed state and is sandwiched between the first surface of the lock shaft and the first surface of the lock sleeve, and wherein the tine finger is parallel to the longitudinal axis;
    wherein the first end of the biasing member is in contact with the second surface of the lock shaft such that the biasing spring is held in a compressed state by the second surface of the lock shaft;
    wherein, in the intermediate position, the lock sleeve is deployed, in use, and the third surface of the lock shaft is configured to engage the protrusion of the tine finger such that the tine finger is configured to move in a direction away from the longitudinal axis towards the lock sleeve; and
    wherein, in the transition position, the tine finger is biased in a direction away from the longitudinal axis towards the lock sleeve by the biasing member, and wherein, when the lock sleeve returns, in use, the third surface of the tine finger contacts the second surface of the lock sleeve to prevent the lock sleeve moving to the closed position.

\* \* \* \* \*